3,275,694
PROCESS FOR THE PREPARATION OF AROMATIC MERCAPTO COMPOUNDS
Willi Hahn, Cologne-Stammheim, and Karl Goliasch, Leverkusen-Schlebusch, Germany, assignors to Farbenfabriken Bayer Aktiengesellschaft, Leverkusen, Germany, a German corporation
No Drawing. Filed July 15, 1963, Ser. No. 295,180
Claims priority, application Germany, Aug. 1, 1962,
F 37,482
9 Claims. (Cl. 260—609)

The invention relates to a process for the preparation of aromatic mercapto compounds in which aromatic compounds selected from the group consisting of aromatic hydroxy compounds and ethers of aromatic hydroxy compounds are reacted with sulphur chlorides and another sulphur compound.

It is already known that organic di- and polysulphides can be split by hydrogenation, compounds which contain sulphhydryl groups being formed in the process. This method, however, has hitherto not gained any importance for the introduction of SH groups into the nucleus of aromatic hydroxy compounds because the polysulphides required as starting materials are very difficult to prepare. The reason for this is that the action of sulphur monochloride on phenols and naphthols does not lead to di-(hydroxyaryl)-disulphides, as would be expected from their formulae, but results in disproportionation reactions and deposition of sulphur to form mixtures of mono- and poly-sulphides in which the monsulphide content predominates. When sulphur dichloride is used, the formation of monosulphide is still more marked, and at the same time chlorine is introduced into the nucleus (see Houben-Weyl, 4th Edition, volume 9, page 137; E. E. Reed, "Organic Chemistry of Bivalent Sulphur," volume III, 223 and S. Onufrowicz, Ber. 23, 3364 (1890), M. M. Richter, Ber. 49, 1024 (1916), H. E. Albert, USP 2, 581, 919).

It is also known that diarylmonosulphides can be hydrogenated to the corresponding mercaptans by means of catalytically activated hydrogen. This method cannot be used on di-(hydroxyaryl)-sulphides because complete desulphurization occurs and no mercaptans are formed (U.S. Patent No. 2,402,686). It has now been found that compounds containing sulphhydryl groups can be obatined by a technically simple method in which aromatic hydroxy compounds which may, if desired, be etherified are treated in a first stage with sulphur chlorides and hydrogen sulphide, and the sulphur-containing reaction products are then reduced in a second stage by methods known per se for the hydrogenating splitting of polysulphides to mercaptans.

The reaction products of the first stage are mixtures in which not all the components are of exactly known constitution. Common to all these products, however, is the fact that they can easily be converted into aromatic compounds containing sulphhydryl groups by the methods used for hydrogenous splitting of polysulphides to mercaptans. It is most probable that the reaction mixtures of the first stage are mainly diarylpolsulphides which, by the definition used in the invention, includes also diaryldisulphides, e.g.

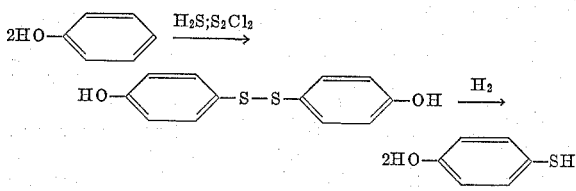

According to the prior art, it was by no means to be expected that the reaction of aromatic hydroxy compounds with sulphur chlorides would be so clearly influenced in the direction of the formation of reducible polysulphides by the presence of hydrogen sulphide.

Hydroxy compounds suitable for the process according to the invention are mono- or polyhydroxy derivatives of mono- or polynuclear aromatic systems, in which the hydroxy groups may be etherified partly or entirely with aliphatic or aromatic radicals. The compounds must carry at least one hydrogen atom in the o- or p-position to a hydroxy group, but otherwise they can be substituted by alkyl or aryl radicals or by halogen, mercapto- and alkyl (aryl)-mercapto groups and quite generally by any substituents which have no marked ability to attract electrons. Examples of these are: phenol, anisole, resorcinol, pyrocatechol-mono-methyl ether, o-hydroxydiphenyl, o-hydroxydiphenylether, 2,6-dihydroxynaphthalene and hydroxyanthracene. Particularly suitable are the monohydroxy compounds of the benzene and naphthalene series as well as their O-alkyl ethers, e.g. phenol, isomeric cresols, isomeric xylenols, o-isopropylphenol, o-sec.-butylphenol, 2,6-di-tertiary-butylphenol, 3-chlorophenol 2-bromophenol, monothio-pyrocatechol, 4-methylmercaptophenol, α- and β-naphthol, 6-chloro-naphthol-(2) and the corresponding methyl- or ethyl ethers.

The compounds may be used in the pure form or as mixtures, e.g. as isomeric mixtures (isomeric cresols or xylenols) in the form in which they are present as technical products.

The sulphur chlorides used are mainly sulphur dichloride and sulphur monochloride (sulphur chloride). However, mixtures of various compounds of sulphur with chlorine may be also be used. The average sulphur content should as far as possible be between that of $SCl_2$ and $S_2Cl_2$ or higher.

The hydrogen sulphide required for the process may be used either in the pure form or in a mixture with other gases which are inert to the reaction components, e.g. nitrogen, hydrogen or air.

The process according to the invention may be carried out with or without solvents. It is preferable to work with solvents particularly when solid starting materials are to be put into the reaction under the given reaction conditions. A large number of the usual solvents are suitable. Examples of suitable solvents are aliphatic or aromatic hydrocarbons and their halogen derivatives such as hexane, ligroin, carbon tetrachloride, ethylene chloride, benzene, toluene and chlorobenzene; alcohols such as methanol or isopropanol; ethers such as diethylether; carboxylic aicds and their esters, such as acetic acid or ethyl acetate; ketones such as acetone or cyclohexanone and acid amides such as dimethylformamide.

It is also possible to use solvents which themselves react with sulphur chlorides, e.g. alcohols or ethers, provided that these reactions are considerably slower than the reaction of the process according to the invention and provided the sulphur chloride is added to the dissolved hydroxyl-containing components which are present in excess.

The first stage of the process according to the invention can be carried out either without a catalyst or in the presence of catalytically active compounds. Although the free hydroxy compounds generally react even without a catalyst, a catalyst is usually advisable for the reaction of the ethers.

Catalytically active compounds for the first stage of the process according to the invention are mainly the Friedel-Crafts catalysts such as proton acids and Lewis acids. Particular examples to be mentioned are iron-(III)-chloride, aluminium chloride, zinc chloride, tin chloride, boron fluoride and anhydrous sulphuric and phosphoric acids. The solid catalysts may be used in the form of a fine powder or in solution.

The reaction of the hydroxy compounds with sulphur chlorides and hydrogen sulphide is preferably carried out in a temperature range of −50° to +200° C., particularly −20° to 100° C., although higher temperatures may be employed. The pressure has no great influence on the reaction. For the sake of economy, therefore, and in order to facilitate the removal of hydrogen chloride and excess hydrogen sulphide the reaction will generally be carried out without excess pressure. The proportions in which the various components are introduced into the reaction depends on the desired end product, since one or several mercapto groups may be introduced.

0.5 to 1.5 mols of sulphur chloride per mol of aromatic compound would be suitable for each sulphhydryl group to be introduced. At least 0.5 mol of hydrogen sulphide should be present per mol of sulphur chloride, but the use of an excess, e.g. up to 10 mols, is frequently an advantage. Where catalysts are used, they should generally be present in quantities of 0.001 to 1 mol, particularly 0.01 to 0.5 mol per mol of aromatic compound.

The first stage of the process according to the invention should preferably be carried out in such a manner that all the three reaction components can react with each other more or less simultaneously. This may be achieved, for example, by first putting the aromatic compound (if desired, in a solvent and with a catalyst) into the reaction, and then adding sulphur chloride and at the same time introducing hydrogen sulphide. Either part or all of the hydrogen sulphide may be present in the components from the start, or alternatively, the aromatic compound and sulphur chloride may be introduced into the solvent placed in the reaction vessel, which may contain catalyst, and the hydrogen sulphide may then be added in doses. Finally, the sulphur chloride may be placed in the reaction vessel and the aromatic compound and hydrogen sulphide may then be added. In all cases, it is advantageous to stir the reaction mixture mechanically to ensure a uniform course of reaction and constant temperature.

The reaction mixture of stage 1 can be worked up by the usual methods. If the reaction is carried out in the presence of solvents the solvents may be removed in a vacuum. Catalysts may be removed by stirring the reaction product with water, the catalyst being thereby transferred into the aqueous phase. The organic phase is dried and, if necessary freed from solvent. If the reaction mixture contains neither solvents nor catalysts, the mixture may be de-gasified to remove dissolved hydrochloric acid and dissolved hydrogen sulphide. For this purpose, a stream of inert gas such as nitrogen may be passed through the reaction product.

It may also be advantageous to carry out the reactions of the first and second stage of the process according to the invention in the same solvent. In that case, it is unnecessary to isolate the reaction products after the first stage. If the presence of hydrogen chloride in the second stage is not desired, the solution may first be treated with acid binding agents (e.g. sodium bicarbonate).

A particular embodiment of the process consists in carrying it out continuously. This may be done, for example, by pumping the hydroxyl components, which may be dissolved in a solvent and may contain catalyst, through a reactor into which the required quantities of sulphur chloride and hydrogen sulphide are added in doses at the same time. The reaction products are removed continuously from the reaction chamber, and excess hydrogen sulphide, if necessary after the removal of hydrogen chloride, is circulated. If the reactor is suitably constructed, the reactants will be sufficiently mixed as a result of the flow conditions, so that mechanical stirring will not be necessary.

Both in the intermittent and in the continuous process it may be advantageous to carry out the reaction in a stream of inert gas (e.g. nitrogen) so that the hydrogen chloride formed can be removed continuously from the reaction mixture.

The sulphur-containing reaction products obtained by the first stage of the process according to the invention can be converted into compounds containing sulphhydryl groups by the known methods for reacting polysulphides to produce mercaptans. A summary of these methods is found, for example, in Houben-Weyl vol. 9, pages 23–28. Methods that may be quoted here are the reaction with nascent or catalytically activated hydrogen, with hydrogen sulphide and its alkali salts, with grape sugar and with alkali metals or alkali metal amalgams.

It is particularly advantageous, also in view of its economy, to carry out the reduction with alkali metal or alkaline earth metal sulphides, sodium amalgams or hydrogen in the presence of catalysts that are resistant to sulphur (see Shirley, Organic Intermediates, page 87 and USP 2, 402, 614 and USP 2, 402, 686).

The aromatic hydroxy compounds containing sulphyhydryl groups as well as their O-alkyl or aryl derivatives, which can all be obtained easily and in good yields by the process according to the invention, as well as the polysulphides which can be isolated as reaction products of the first stage, were hitherto accessible only by complicated methods. They are valuable intermediate products for the synthesis of pesticides, age-resistors, dyestuffs and high molecular weight substances.

*Example 1*

216 parts by weight of m-cresol are introduced into 600 parts by volume of ethylene chloride in a flask equipped with stirrer, and 10,000 parts by volume (15.2 parts by weight) of gaseous $H_2S$ are introduced at +10° C. 206 parts by weight of $SCl_2$ are then added dropwise at a uniform rate in the course of 2 hours, and at the same time 45,000 parts by volume of $H_2S$ gas (68 parts by weight) are passed through the solution. After stirring the mixture for another hour at +10° C., the reaction solution is thoroughly stirred with water.

The dry polysulphide solution is then treated with 30 parts by weight of cobalt trisulphide catalyst (prepared according to Shirley, Organic Intermeditaes, page 87), and hydrogenated at 150° C. with 100 atmospheres excess hydrogen pressure until the pressure is constant (2 hours). The reaction solution is separated from this catalyst by filtration and the solvent is distilled off at 50° C. in vacuo. 203 parts by weight of a pale yellow liquid, 87% of which can be distilled (boiling range 70 to 240° at 5 mm. Hg) remain behind. According to gas chromatographic analysis, the distillate consists of 15% m-cresol, 9.4% o-mercapto-m-cresol + chloro-m-cresol
70.9% p-mercapto-m-cresol and
3.8% discresol-sulphide m-Cresol and p-mercapto-m-cresol (B.P. $_{10\ mm.}$ 144° C.) may be obtained pure by fractional distillation. The yield of p-mercaptocresol is 51% of the theoretical yield (calculated on cresol). The compound recrystallised from ligroin melts at 58 to 60° C. (colourless crystals).

The constitution was proved by infra-red and nuclear resonance measurements to be 4-mercapto-3-methylphenol.

In the analogus experiment carried out for comparison in which m-cresol was reacted with $S_2Cl_2$ without hydrogen sulphide, followed by hydrogenataion of the sulphide mixture, only 20.5% of the theoretical yield of 4-mercapto-m-cresol calculated on the cresol could be obtained under the optimum conditions for mercaptan formation (1 mol $S_2Cl_2$ to 2 mols of cresol, reaction temperature 50° C.).

If a mixture of $S_2Cl_2$ and elementary, dissolved sulphur is left to act on cresol in the absence of hydrogen sulphide, most of the sulphur remains unchanged and can be recovered from the reaction mixture. The quantity of mercaptan obtained after hydrogenation is only insignificantly higher than that obtained without the addition of sulphur. Thus when 1 mol of $S_2Cl_2$, 1 mol of sulphur and 2 mols of m-cresol in benzene were reacted together at 60° C. and then hydrogenated, only 24.5% of 4-mercapto-m-cresol were obtained.

In the reaction of $SCl_2$ on m-cresol in ethylene chloride at +10° C. in the absence of hydrogen sulphide, the predominant product obtained was di-cresol-monosulphide (see also Dunning et al., J. Am. Soc. 53, 3466 (1931)).

*Example 2*

108 parts by weight of anisole and 150 parts by volume of methylene chloride and 103 parts by weight of sulphur dichloride in 200 parts by volume of methylene chloride were introduced dropwise into 200 parts by volume of methylene chloride in the presence of 7 parts by weight of aluminum chloride at 38° C., 22400 parts by volume (=34 parts by weight) of hydrogen sulphide being introduced.

The total reaction time is 4 hours, the mixture is then stirred into 2000 parts by volume of water and filtered off from 9 parts by weight of sulphur. The aqueous phase is extracted with methylene chloride. After hydrogenation of the combined organic phases (3 hours at 150° C. and 100 atmospheres of hydrogen, 30 parts by weight of cobalt trisulphide as catalyst, the products being worked up as in Example 1) 58 parts by weight of 4-mercapto-anisole (B.P. 88–90° C. at 5 mm. Hg; 54% of theoretical, calculated on the amount of conversion) are obtained.

*Example 3*

In an analogous manner to Example 2, 122 parts by weight of 3-methoxy-1-methyl-benzene are treated with 103 parts by weight of sulphur dichloride in the same quantities of methylene chloride with 7 parts by weight of aluminium chloride as catalyst and with the introduction of 23000 parts by volume (=36 parts by weight) of hydrogen sulphide at 38° in 4 hours. After hydrogenation and distillation, 47 parts by weight of 6-mercapto-3-methoxy-1-methylbenzene (B.P. 170° C. at 10 mm. Hg, 42% of the theoretical yield calculated on the conversion) are obtained.

*Example 4*

216 parts by weight of m-cresol are dissolved in 600 parts by volume of methanol and treated, by the process described in Example 1, with the same quantities of sulphur dichloride and hydrogen sulphide described there. When the reaction is completed, a small amount of sulphur (6 parts by weight), which has separated as an oily deposit is removed by filtration. The solution is poured into 150 parts by weight of a mixture of ice and water and the reaction product separates as a yellow oil. This is taken up in 800 parts by volume of benzene, the benzene solution is washed free from acid with water and condensed by evaporation in vacuo at 50° C. A clear yellow viscous mass (310 parts by weight) having a sulphur content of 35.9% remains behind.

*Example 5*

In an analogous manner to Example 2, 414 parts by weight of 1,2-dimethoxybenzene in 400 parts by volume of methylene chloride and 309 parts by weight of sulphur dichloride in 400 parts by volume of methylene chloride are added dropwise simultaneously into a boiling solution of 300 parts by volume of methylene chloride and 20 parts by weight of aluminum chloride, 92000 parts by volume (=140 parts by weight) of hydrogen sulphide being introduced. The total reaction time is 6 hours. After hydrogenation and distillation, 155 parts by weight of 4-mercapto-1,2-dimethoxy-benzene (B.P. 128–130° C. at 9 mm. Hg; 41% of the theoretical yield calculated on the conversion) are obtained.

*Example 6*

188 parts by weight of phenol in 400 parts by volume of ethylene chloride are saturated with hydrogen sulphide at 10° C. A solution of 206 parts by weight of $SCl_2$ and 100 parts by volume of ethylene chloride is then added dropwise in the course of 2 hours with stirring, and at the same time, 152 parts by weight of hydrogen sulphide are added at a uniform rate of flow. When this addition is completed, the mixture is stirred for another ½ hour at 20° C., and a stream of nitrogen is then passed through the reaction mixture to remove HCl and $H_2S$. 130 parts by weight of the reaction solution are concentrated by evaporation in vacuo at 50° C., 44 parts by weight of a viscous yellow oil having a sulphur content of 37.4% and a chlorine content of 0.5% remain behind.

The remaining 730 parts by weight of polysulphide solution are treated with 35 parts by weight of cobalt trisulphide catalyst in an autoclave for 3 hours at 150° with 110 atmospheres of hydrogen above atmospheric pressure. When the mixture is cold, the catalyst is filtered off and the solvent is removed from the filtrate by distillation. The distillation residue, 176 parts by weight, is fractionally distilled in vacuo. 105 parts by weight of 4-mercapto-phenol (B.P.$_{5mm.}$=110 to 115°, M.P.=30° C.) in addition to 50 parts by weight of unchanged phenol and a small amount of chlorophenol are obtained.

The reaction can be carried out in the same way in benzene instead of ethylene chloride as solvent.

*Example 7*

257 parts by weight of o-chlorophenol are reacted in 600 parts by volume of ethylene chloride with 206 parts by weight of $SCl_2$ and 92 parts by weight of $H_2S$ at 40° C., as in Example 6. The reaction mixture, in which a small amount of separated sulphur is present, is shaken with 500 parts by volume of water and the organic layer is filtered and, as in Example 6, hydrogenated in the presence of cobalt trisulphide. The separation of the product by distillation results in 80 parts by weight of unchanged chlorophenol and 95 parts by weight of 4-mercapto - 2 - chlorophenol, B.P.$_{5mm.}$=106–110° C. (M.P. 50°).

$C_6H_5OClS$ (160.5)—Found: Cl, 21.85%; S, 19.7%. Calculated: Cl, 22.1%; S, 19.9%.

*Example 8*

206 parts by weight of $SCl_2$ are run into a solution of 300 parts by weight of o-sec.-butyl-phenol in 600 parts by volume of ethylene chloride, and 110 parts by weight of gaseous hydrogen sulphide are introduced at the same time. The reaction takes place with vigorous evolution of HCl. The reaction mixture is washed free from acid with water.

When the solvent is distilled off in vacuo from 30 parts by volume of this solution (altogether 1046 parts by weight) 36 parts by weight of a viscous yellow liquid which is found on analysis to contain 25.0% S and 1.2% Cl are left behind.

The main portion of the solution is hydrogenated for 2 hours at 150° C. at 100 atmospheres excess $H_2$ pressure after the addition of 35 parts by weight of $Co_2S_3$. After removal of the catalyst and of the solvent, the hydrogenation mixture is fractionally distilled in vacuo. In addition to 65 parts by weight of o-sec.butyl-phenol, 175 parts by weight of 4-mercapto-2-sec.butyl phenol are obtained as a colorless oil, B.P.$_{5mm.}$ 140–145° C.

$C_{10}H_{14}OS$ (182)—Calculated: S, 17.5%. Found: S, 17.2%.

The reduction of polysulphide to mercaptans may also be carried out with the aid of $Na_2S$. In this case, the polysulphide solution is stirred with excess $Na_2S$ dissolved in water. Owing to the alkalinity of $Na_2S$, the polysulphide goes into the aqueous phase as a phenolate. When the reduction is complete, the solution is neutralized and the mercapto compound is obtained from the organic layer as above.

*Example 9*

By the process described in Example 8, 412 parts by weight of 2,6-di-tertiary butylphenol in ethylene chloride are treated with the same quantity of $SCl_2$ and hydrogen sulphide at 0 to 10°. When the product is worked up in an analogous manner, the polysulphide is obtained as a viscous yellow oil (S=20.2%; Cl=0.4%).

The reaction to 4-mercapto-2,6-di-tertiary butyl phenol is carried out with $Co_2S_3/H_2$ as in Example 8. In addition to unchanged 2,6-di-tertiary-butylphenol, 230 parts by weight of mercapto compound of B.P.$_{5mm}$ 150–154° C. are obtained (M.P. 80 to 83° C.).

$C_{14}H_{22}OS$ (238)—Calculated: S, 13.4%. Found: S, 13.0%.

*Example 10*

In an analogous manner to Example 2, 385 parts by weight of 2-methoxy-1-methylbenzene in 300 parts by volume of ethylene chloride and 325 parts by weight of sulphur dichloride in 300 parts by volume of ethylene chloride and 27 parts by weight of aluminium chloride are introduced dropwise and at the same time 96600 parts by volume (=147 parts by weight) of hydrogen sulphide are introduced. The reaction time is 3 hours and the temperature 50° C. After hydrogenation and distillation, 185 parts by weight of 2-methoxy-5-mercapto-1-methylbenzene (B.P. 97° at 2.6 mm. Hg; 47% of theoretical yield calculated on the conversion) are obtained.

*Example 11*

In an analogous manner to Example 2, 60.5 parts by weight of 4,6 - dimercapto-3-methoxy-1-methylbenzene (B.P. 120–125° C. at 0.8 mm. Hg; 12% of the theoretical yield calculated on the conversion) and 158 parts by weight of 6-mercapto-3-methoxy-1-methylbenzene (B.P. 76 to 82° C. at 0.25 mm. Hg; 38% of theoretical yield calculated on the conversion) are obtained from 366 parts by weight of 3-methoxy-1-methylbenzene, 618 parts by weight of sulphur dichloride, 30 parts by weight of aluminium chloride, 100, 200 parts by volume of hydrogen sulphide in a total of 1100 parts by volume of ethylene chloride at a reaction temperature of 50° C. and a reaction time of 5 hours, after hydrogenation and distillation.

*Example 12*

By the method described in Example 2, the following compounds are obtained from corresponding starting components:

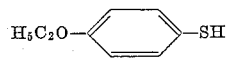

4-mercapto-1-ethoxybenzene (B.P. 155–160° C. at 40 mm. Hg; 57% of theoretical yield calculated on the conversion)

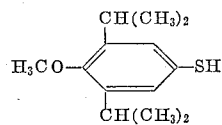

2-methoxy-5-mercapto - 1:3 - diisopropyl-benzene (B.P. 112–116° C. at 1 mm. Hg; 47% calculated on the conversion)

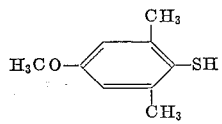

5-methoxy-2-mercapto-1:3 - dimethylbenzene (B.P. 126–130° C. at 10 mm. Hg; 30% yield calculated on the conversion)

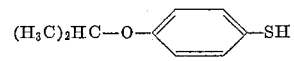

4-mercapto-1-isopropoxy-benzene (B.P. 67–70% C. at 0.18 mm. Hg; 42% of theoretical yield calculated on the conversion).

*Example 13*

For the continuous reaction of m-cresol with disulphur dichloride ($S_2Cl_2$) and hydrogen sulphide, 2 methylene chloride solutions containing respectively 3 mols of m-cresol and 3 mols of $S_2Cl_2$ per litre are pumped into the bottom of a vertical reaction tube by means of two liquid dosing pumps at such a ratio that 0.8 mol of $S_2Cl_2$ are used per mol of cresol. The $S_2Cl_2$ enters through a thin capillary in order to produce a high flow velocity and to prevent back flow of the reaction liquid into the delivery duct when the pump is at a standstill. At the same time, 0.6 mol of gaseous hydrogen sulphide per mol of $S_2Cl_2$ are introduced into the circulating solution.

The temperature in the reactor is adjusted to 10° C. by external cooling means. The vigorous evolution of HCl produces sufficient stirring up of the reaction mixture. Liquid reaction mixture is continuously removed from the top end of the tube, and the waste gas is removed overhead.

100 parts by volume of reaction mixture contain 35 parts by weight of polysulphide which can be isolated as a viscous oil by evaporating the solvent (S=35.3%, Cl=0.8%). The polysulphide can be hydrogenated to 4-mercapto-m-cresol by the method already described several times above.

Benzene may be used as solvent instead of methylene chloride, in which case 2 mols of cresol or 2 mols of $S_2Cl_2$ are used per litre.

We claim:

1. Process for the production of an aromatic mercapto compound, which comprises reacting a member selected from the group consisting of mono- and poly-hydroxy compounds, the hydroxy groups of which may be at least in part etherified with a member selected from the group consisting of aliphatic and aromatic substituents and which carry at least one hydrogen atom in a position ortho- or para- to a hydroxy group, further characterized in that they carry no substituent on the aromatic nucleus having a marked ability to attract electrons, with sulphur chlorides and hydrogen sulphide at a temperature of —50 to +200° C., recovering the polysulphide thereby formed and reducing said polysulphide to the mercaptan.

2. Process according to claim 1, which comprises effecting said reaction in the presence of an inert organic solvent.

3. Process according to claim 2 wherein said inert organic medium is selected from the group consisting of hexane, ligroin, toluene, carbon tetrachloride, ethylene chloride, chlorobenzene, methanol, isopropanol, diethyl-ether, acetic acid, ethyl acetate, acetone, cyclohexanone and dimethyl-formamide.

4. Process according to claim 1, which comprises effecting said reaction in the presence of a catalyst.

5. Process according to claim 4 wherein the catalyst is selected from the group consisting of ferric chloride, aluminium chloride, zinc chloride, tin chloride, boron fluoride, anhydrous sulphuric acid and anhydrous phosphoric acid.

6. A process for the production of mercapto phenols which comprises reacting a phenol with sulphur chlorides and hydrogen sulphide said reacting being effected at a temperature of —50° and +200° C., recovering the polysulphide thereby formed and reducing said polysulphide to the mercaptan.

7. Process according to claim 6 wherein the phenol is a member of the group consisting of phenol, a cresol, a xylenol, o-isopropylphenol, o-sec.-butylphenol, 2,6-ditertiary-butyl-phenol, 3-chlorophenol, 2-bromophenol, monothio-pyrocatechol, 4-methylmercaptophenol, α-naphthol, β-naphthol and 6-chloro-naphthol-(2).

8. A process for the production of mercapto phenol ethers which comprises reacting a phenol ether with sulphur chlorides and hydrogen sulphide said reacting being effected at a temperature of −50° and +200° C., recovering the polysulphide thereby formed and reducing said polysulphide to the mercaptan.

9. Process according to claim 8 wherein the phenol ether is a member of the group consisting of phenol methyl, ether, a cresol ethyl ether, a xylenol methyl ether, o-isopropylphenol-ethyl ether, o-sec.-butylphenol methyl ether, 3-chloro-phenol methyl ether, 2-bromophenol ethyl ether, monothio-pyrocatechol methyl ether, α-naphthol ethyl ether, β-naphthol-methyl ether and 6-chloro-naphthol-(2)-ethyl ether.

No references cited.

CHARLES B. PARKER, *Primary Examiner.*

DELBERT R. PHILLIPS, *Assistant Examiner.*